United States Patent
Wang et al.

(10) Patent No.: US 8,201,983 B2
(45) Date of Patent: Jun. 19, 2012

(54) ILLUMINATING DEVICE

(75) Inventors: Wei-Chih Wang, Hsin-Chu (TW); Udo Custodis, Hsin-Chu (TW); Wen-Chiao Chang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 63 days.

(21) Appl. No.: 12/790,995

(22) Filed: Jun. 1, 2010

(65) Prior Publication Data

US 2011/0291560 A1 Dec. 1, 2011

(51) Int. Cl.
*F21V 29/00* (2006.01)
(52) U.S. Cl. .................. 362/602; 362/373; 362/555
(58) Field of Classification Search .................. 362/216, 362/218, 255, 256, 294, 373, 551, 555, 602, 362/628

See application file for complete search history.

(56) References Cited

U.S. PATENT DOCUMENTS

| 7,699,490 B2 * | 4/2010 | Tsai et al. ...................... 362/255 |
| 7,726,860 B2 * | 6/2010 | Harrity et al. ................. 362/555 |
| 7,950,829 B2 * | 5/2011 | Chiu et al. ..................... 362/294 |
| 7,972,053 B2 * | 7/2011 | Hatti et al. ..................... 362/628 |
| 2004/0066659 A1 * | 4/2004 | Mezei et al. .................. 362/551 |

FOREIGN PATENT DOCUMENTS

TW  584195  4/2004
TW  M323018  12/2007

* cited by examiner

*Primary Examiner* — Y My Quach Lee
(74) *Attorney, Agent, or Firm* — Jianq Chyun IP Office (57) ABSTRACT

An illuminating device includes a tubular light guide, a plurality of light-emitting devices, and a base. The tubular light guide has a light input edge and an inner space. The light-emitting devices are distributed at the light input edge to provide lights into the tubular light guide. The base supports the light-emitting devices and the tubular light guide. The base also has an electronic circuit to provide power to the light-emitting devices. The base has at least one air circulation hole for connecting an outer space with the inner space.

20 Claims, 8 Drawing Sheets

ILLUMINATING DEVICE

BACKGROUND OF THE INVENTION

1. Field of Invention

The invention related to illuminating device based on LED with air cooling channel.

2. Description of Related Art

Figure 1:
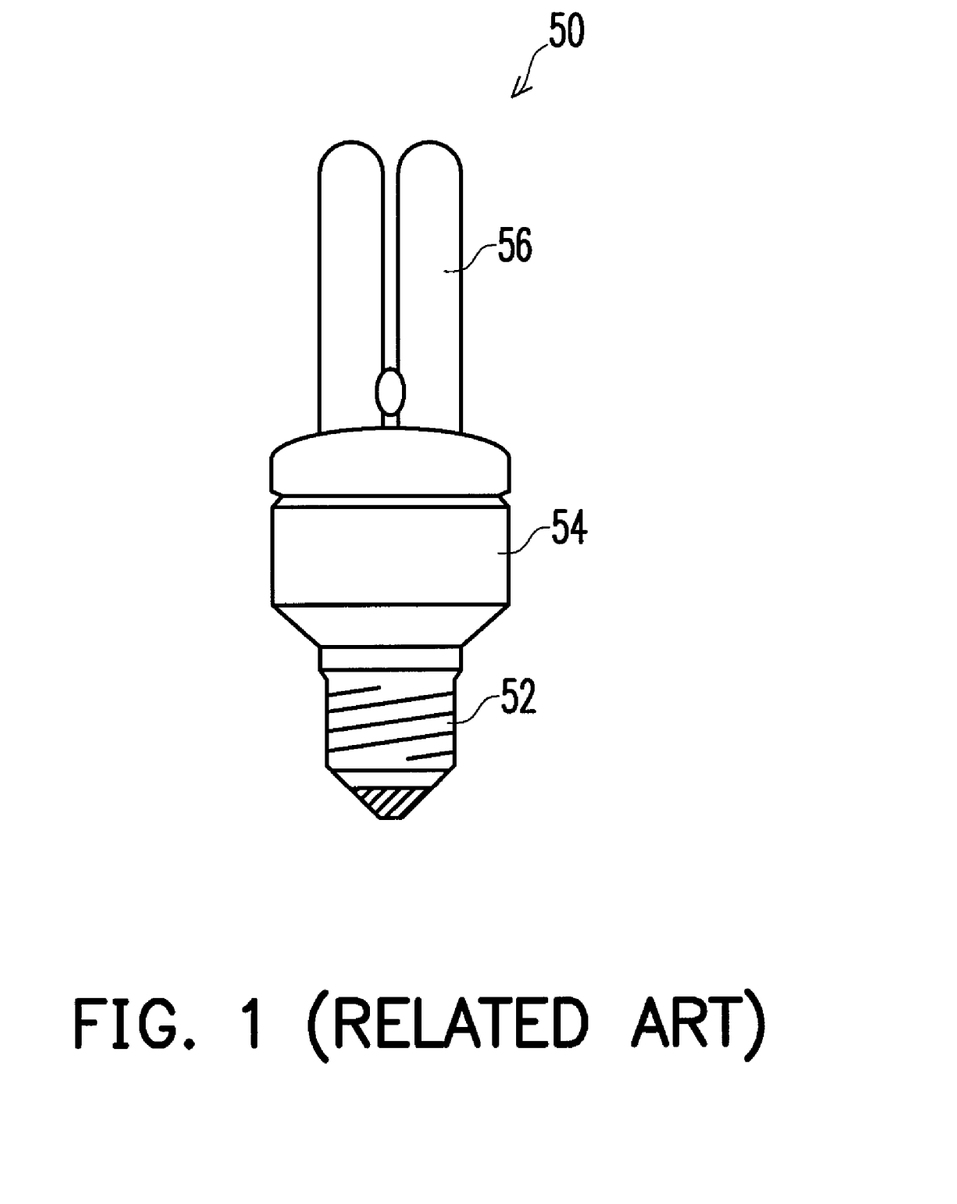
FIG. 1 is a drawing, schematically illustrating the conventional lamp.

The illuminating device has various applications. There are various mechanisms to produce the illuminating light, as known in the conventional art. FIG. 1 is a drawing, schematically illustrating the conventional lamp. In FIG. 1, the conventional lamp 50 includes a power connection structure 52, a base 54, and a light tube 56. The power connection structure 52 is used to connect to the power source. The base 54 has electric circuit to convert the external power to the operation voltages for the light tube 56. The light tube 56, filled with the gas, generates the illuminating light under the operation voltages.

The lamp 50 in FIG. 1 consumes the power. Recently, the illuminating device based on LED (light-emitting diode) has been proposed. The LED consumes less power and may replace the conventional lamp. A disclosure in Taiwan utility model patent No. M323018 has proposed a flashlight based on LED as the light source. Several LEDs are distributed at the light outputting surface for the flashlight, so as to replace the light bubble. The geometric outer shape and operation manner is like the conventional flashlight. Further, a disclosure in Taiwan utility model patent No. 584195 has proposed a light bar based on LED as the light source. The LED panel with several LEDs disposed at a small-size end of a cone-like central reflection structure. The LEDs surround the cone-like central reflection structure. The cone-like central reflection structure receives the lights from the LEDs and reflects the light at the lateral direction. After a round tube covers the LEDs and the cone-like central reflection structure, a round light bar may be formed.

Although the illuminating device is designed various forms for different uses. More illuminating devices in different structure are still under developing, so as to satisfy the requirement and applications from the users.

SUMMARY OF THE INVENTION

The invention provides an illuminating device, which may have cooling efficiency and may even save the volume of the base.

In an embodiment, an illuminating device includes a tubular light guide, a plurality of light-emitting devices, and a base. The tubular light guide has a light input edge and an inner space. The light-emitting devices are distributed at the light input edge to provide lights into the tubular light guide. The base supports the light-emitting devices and the tubular light guide. The base also has an electronic circuit to provide power to the light-emitting devices. The base has at least one air circulation hole for connecting an outer space with the inner space.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

It should be also noted that the invention is not just limited to the provided embodiments. In addition, the embodiments may also be properly combined into other embodiments.

Figure 2:
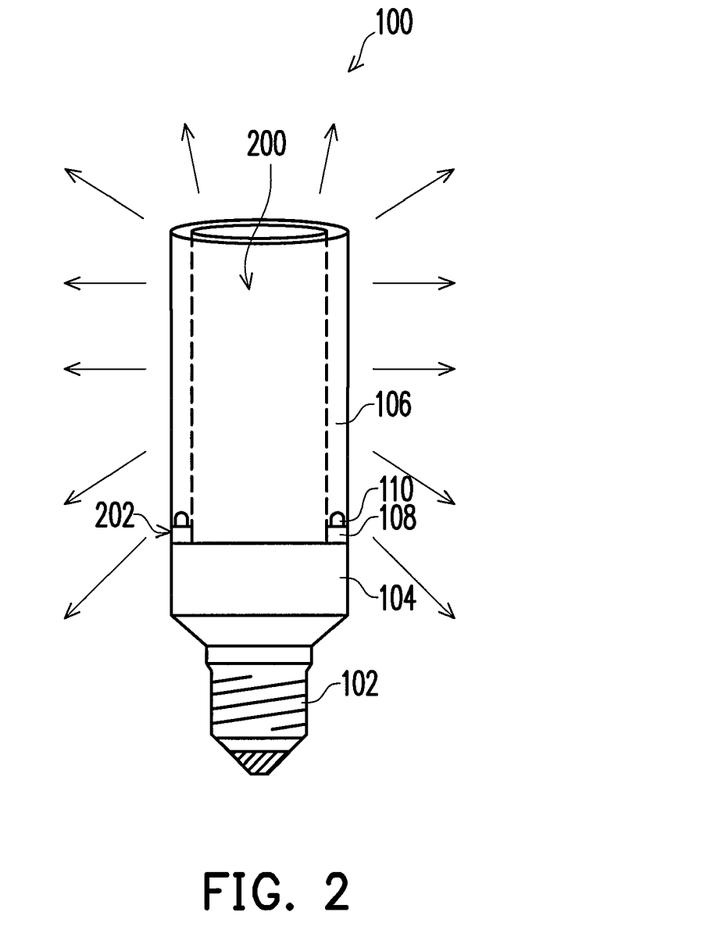
FIG. 2 is a drawing, schematically illustrating a perspective structure of an illuminating device, according to an embodiment of the invention.

FIG. 2 is a drawing, schematically illustrating a perspective structure of an illuminating device, according an embodiment of the invention. In FIG. 2, an illuminating device 100 is proposed. The illuminating device 100 includes a power connection structure 102, light-emitting device 110, a base 104, and a tubular light guide 106. The tubular light guide 106 has an inner space 200 and a light input edge 202. The light-emitting devices 110 are distributed at the light input edge 202 to provide lights into the tubular light guide 106. The base 104 supports the light-emitting devices 110, such as LED, and the tubular light guide 106. As to be further shown later embodiments, the base 104 may also have electronic circuit to provide power to the light-emitting devices 110. Even further for example, the base 104 may have at least one air circulation hole for connecting an outer space with the inner space.

Figure 12:
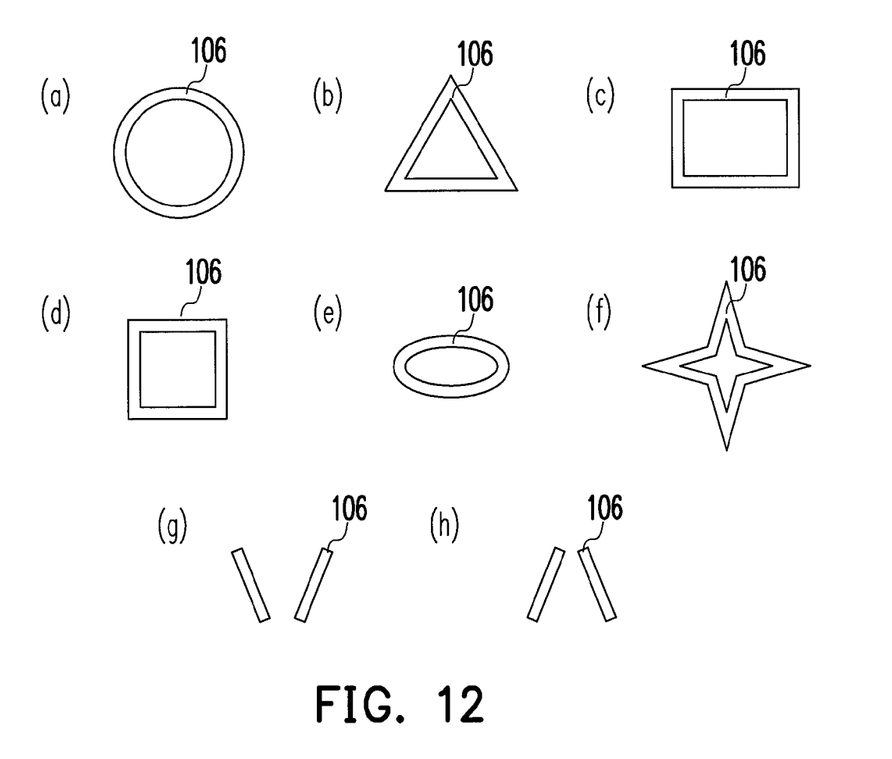
FIG. 12 is a drawing, schematically illustrating cross-sectional geometrical structures of illuminating devices, according embodiments of the invention.

In the embodiment, the base 104 may also include an adapting layer 108 to adapt the light-emitting devices 110 thereon and to electric connect to the power in the base 104. In general, the adapting layer 108 is part of the base 104 in any proper structure without just limited to the embodiment. The light-emitting devices 110 with respect to the tubular light guide 106 are the edge light implementation, so that most of the lights from the light-emitting devices 110 enter the tubular light guide 106. The tubular light guide 106 may be coupled with the base 104 by a usual manner, such as a coupling wall. The light-emitting devices 110 may even be embedded into the tubular light guide 106 at the light input edge 202. It may also be noted that the cross-sectional geometric shape of the tubular light guide 106 is not just restricted to a round shape. FIG. 12 is to shown some more shapes in choice.

Figure 3:
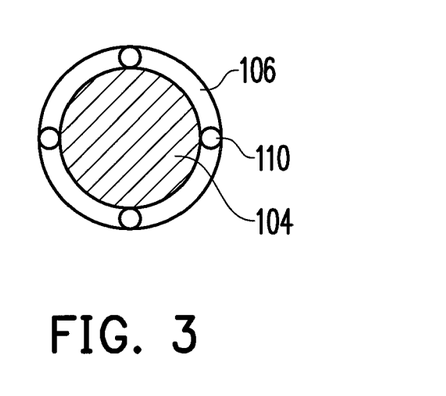
FIG. 3 is a drawing, schematically illustrating a top view of the illuminating device, according to an embodiment of the invention.

FIG. 3 is a drawing, schematically illustrating a top view of the illuminating device, according to an embodiment of the invention. In FIG. 3, when looking at the illuminating device from the top, the light emitting devices 110 are disposed on the base 104 and distributed under the tubular light guide 106. The light emitting devices 110 may still be seen from the top edge of the tubular light guide 106. Since the light illuminating device 100 is for illumination, light leakage from the tubular light guide 106 for the light illuminating device 100 may not be much concerned. The light may emit sideward or even upward. However, some reflection layer or light shielding layer may be added as to be described later.

Figure 4:
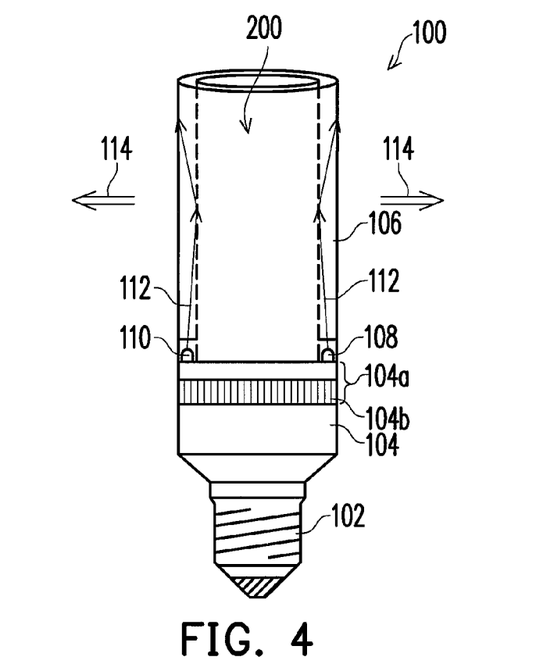
FIG. 4 is a drawing, schematically illustrating a perspective structure of an illuminating device, according to an embodiment of the invention.

FIG. 4 is a drawing, schematically illustrating a perspective structure of an illuminating device, according an embodiment of the invention. In FIG. 4, based on the structure in FIG. 2, the light paths 112 of the lights from the light-emitting device 110 are shown. In general, due to the effect of the tubular light guide 106, the lights are reflected and guided. A portion of the lights then emit from the side surface of the light-emitting device 110 as the side light beam 114.

In further consideration of the cooling mechanism, additional cooling structure may be added to the illuminating device 100. In this embodiment, the base 104 may have at least one air circulation hole 104b. In this embodiment, the base 104 may have an air circulation wall 104a, and several air circulation holes 104b are formed on the air circulation wall 104a in a distribution surrounding the air circulation wall 104a. The adapting layer 108, for example, may be disposed on the air circulation wall 104a of the base 104. The air circulation holes 104a connect the outer space with the inner space 200.

Figure 5:
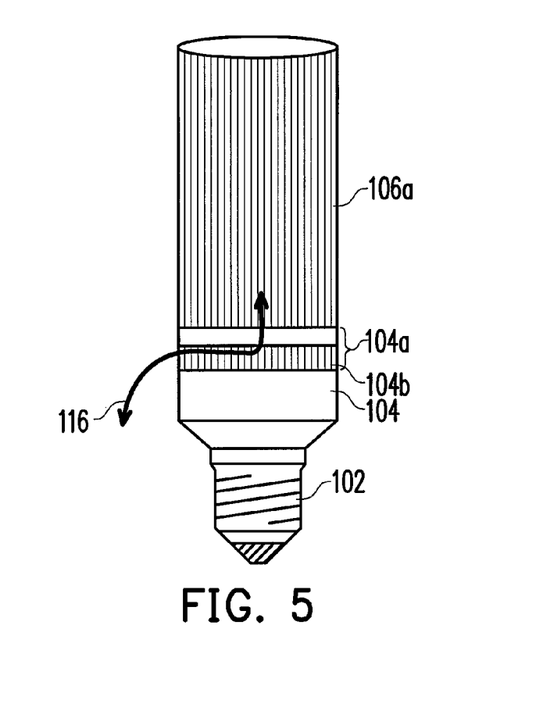
FIG. 5 is a drawing, schematically illustrating a cooling mechanism for the illuminating device, according to an embodiment of the invention.

FIG. 5 is a drawing, schematically illustrating a cooling mechanism for the illuminating device, according an embodiment of the invention. In FIG. 5, due to the air circulation hole 104b, an air circulation channel 116 may be created. As a result, the outer air may flow through the air circulation hole 104b to cool the inner space 200. In this situation, the light-emitting device may be efficiently cooled by the air. In addition, in order to couple the light within the tubular light guide 106, surface texture 106a may be formed at an outer surface or an inner surface of the tubular light guide 106, or even both the outer surface and the inner surface. The texture may be any proper pattern depending on what the effect to be achieved, without specific limitation. In this example, the scratched lines may be formed on the outer surface of the tubular light guide 106.

Figure 6:
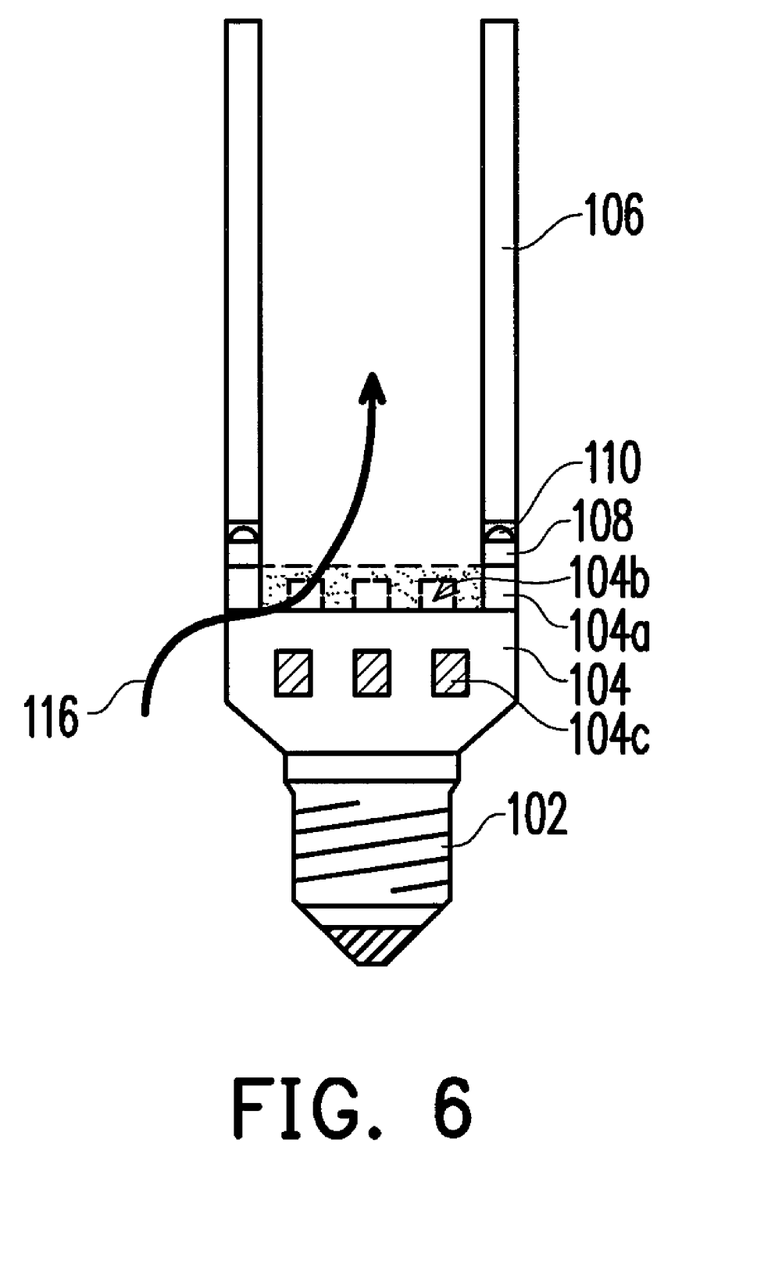
FIG. 6 is a drawing, schematically illustrating a cross-sectional structure of an illuminating device, according to an embodiment of the invention.

FIG. 6 is a drawing, schematically illustrating a cross-sectional structure of an illuminating device, according an embodiment of the invention. In FIG. 6 with furthermore detail, the base 104 includes the electronic circuit 104c embedded therein for converting the external power from power connection structure 102 into the operation power fro the light-emitting devices 110. The air circulation wall 104a of the base 104 has the air circulation holes 104b. Here, the air circulation holes 104b are shown in dashed line. This means that the air circulation holes 104b cannot be seen at the cross-sectional structure. However, when looking at the air circulation wall 104a from the side, the air circulation holes 104b may be seen, as to an embodiment to be shown in FIGS. 7A-7B.

Figure 7A:
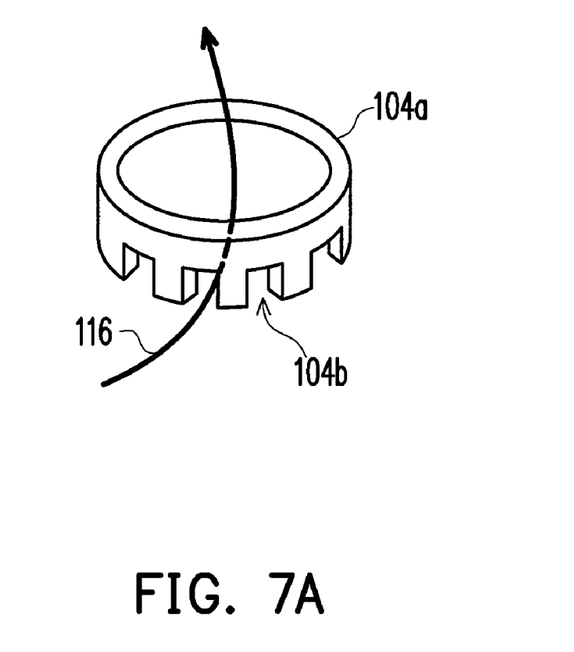
FIGS. 7A-7B are drawings, schematically illustrating perspective view and cross-sectional view of the air circulation wall of an illuminating device, according to an embodiment of the invention.
Figure 7B:
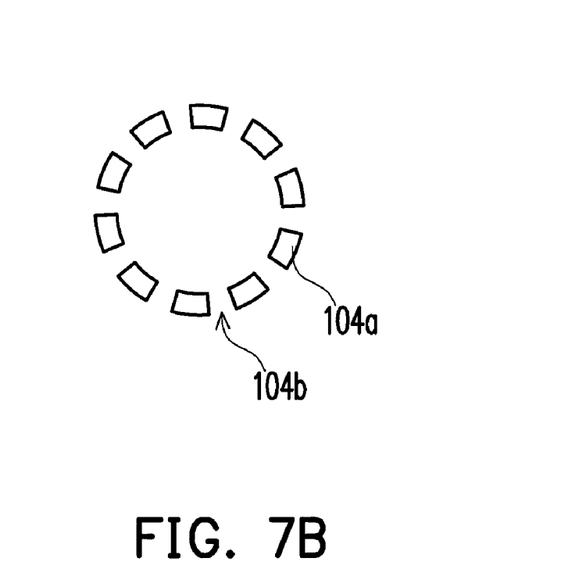

FIGS. 7A-7B are drawings, schematically illustrating perspective view and cross-sectional view of circulation holes of an illuminating device, according to an embodiment of the invention. In FIG. 7A, the portion of the air circulation wall 104a of the base 104 shown in perspective view has the air circulation holes 104b, allowing the air circulation channel 116 to be created. In FIG. 7B, a cross-sectional view crossing the air circulation holes 104b is shown. The air circulation holes 104b may be a slits or gaps in the air circulation wall 104a for connecting the outer space and the inner space.

Figure 8:
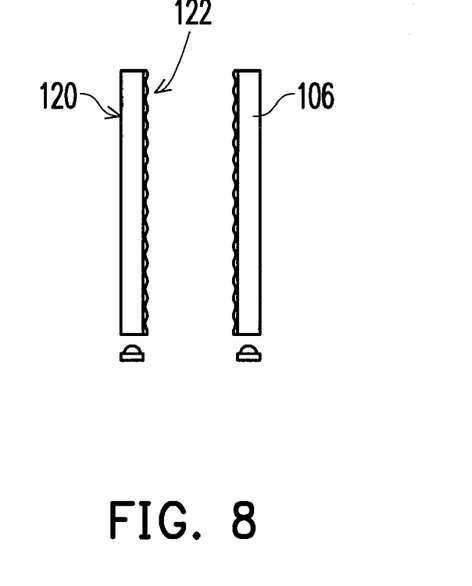
FIG. 8 is a drawing, schematically illustrating a cross-sectional structure of an illuminating device for the light guide, according to an embodiment of the invention.

FIG. 8 is a drawing, schematically illustrating a cross-sectional structure of an illuminating device for the light guide, according to an embodiment of the invention. In FIG. 8, a further embodiment is shown for designing the tubular light guide 106. Material of the tubular light guide 106 may be, for example, plastic. In order to couple the light within the light guide, the surface texture 120 may be formed on the outer surface of the tubular light guide 106. Further, if the lights leak into the inner space, the light intensity to the side may be reduced. In this situation, the surface texture 122 may be formed on the inner surface of the tubular light guide 106, so that the light may be scattered toward the side direction. It may be noted that the surface texture 120 and the surface texture 122 may implemented both or jut one of them, depending on actual design.

Figure 9:
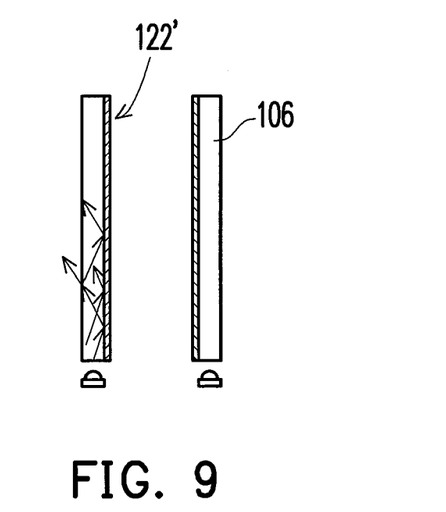
FIG. 9 is a drawing, schematically illustrating a cross-sectional structure of an illuminating device for the light guide, according to an embodiment of the invention.

FIG. 9 is a drawing, schematically illustrating a cross-sectional structure of an illuminating device for the light guide, according to an embodiment of the invention. In FIG. 9 for alternative option, the inner surface of the tubular light guide 106 may be formed with a light reflection layer 122', such as coated meat layer. In this embodiment, the lights are leaking into the inner space of the tubular light guide 106, the lights are then reflected back to the outer side. The illuminating intensity may be improved.

Figure 10:
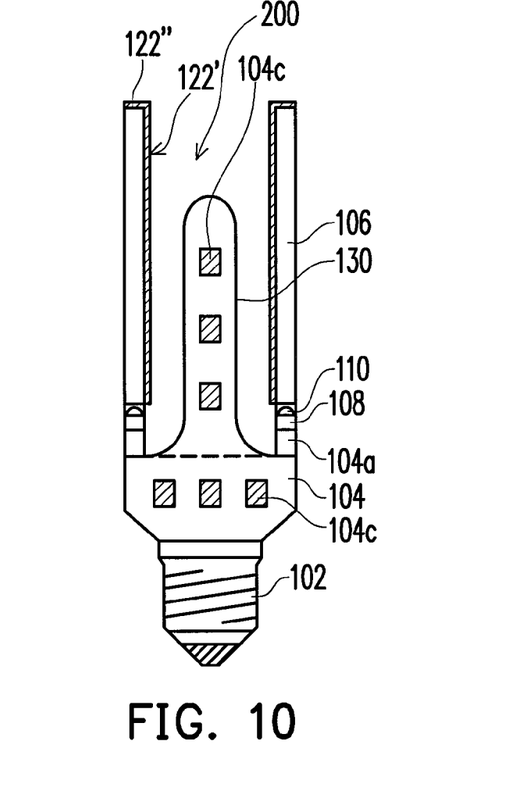
FIGS. 10-11 are drawings, schematically illustrating cross-sectional structures of illuminating devices, according to embodiments of the invention.
Figure 11:
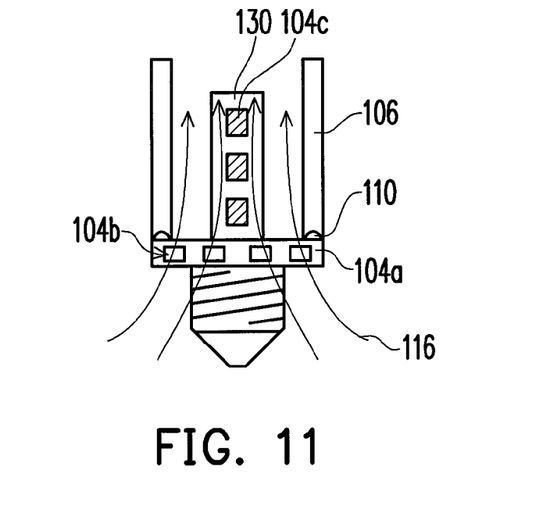

FIGS. 10-11 are drawings, schematically illustrating cross-sectional structures of illuminating devices, according to embodiments of the invention. In FIG. 10, based on the structure in FIG. 9, the inner surface of the tubular light guide 106 is coated with a light reflection layer 122' and the inner space is therefore invisible. An addition reflection layer 122" may be optionally added on the top edge of the tubular light guide 106. In this structure, the inner space 200 is free for use without disturbing the illumination effect. Then, a portion of the base 104 has a protruding portion 130 to protrude into the inner space 200 and at least a portion of the electronic circuit 104c embedded in the base 104 may also be disposed within the protruding portion 130 in the inner space 200. As a result, the volume of the base 104 outside the tubular light guide 106 may be reduced. In addition, the cooling mechanism of the air circulation wall 104a is kept to efficiently cool the electronic circuit and the light-emitting device 110.

With the same aspect in FIG. 10, all of the electronic circuit 104c may be embedded in the protruding portion 130 of the base. In this manner as an example, only the air circulation wall 104a is serving as the base to support the tubular light guide 106 and the light-emitting device 110. The air circulation holes 104b is formed on the air circulation wall 104a, so that the air circulation channel 116 may allow the cooling air to flow from outside into the inner space. In a further example, the light emitting devices 110 are disposed on the air circulation wall 104a and insert in the tubular light guide 106. As a result, the total volume may be effectively reduced.

For the further examples, more structure designs with decoration effect may be added. The surface texture of the tubular light guide 106 may also be designed with a specific pattern to also produce the decoration effect. In another example, when the tubular light guide 106 is with a certain degree of transparency, the protruding portion of the base may even also have specific pattern for decoration. This would improve the visual feeling for the illuminating device.

Even further, the foregoing embodiments for the tubular light guide 106 use the uniform round tube as the example for descriptions. However, the tubular light guide 106 may be in various shapes in accordance with the actual design and need. FIG. 12 is a drawing, schematically illustrating cross-sectional geometrical structures of illuminating devices, according embodiments of the invention. In FIG. 12(a) to FIG. 12(f), several examples of geometric shapes in transversal cross-section of the tubular light guide 106 are shown. It may be round, triangular, rectangular, square, elliptic, or start-like. In FIG. 12(g) to FIG. 12(h), the cross-sectional views along the longitudinal of the tubular light guide 106 are shown. The wall of tubular light guide 106 may be slant to have the cone-like structure. It may be also noted that, the geometric shapes in FIG. 12 are to show some modifications to design the tubular light guide. However, the invention is limited to the examples in FIG. 12.

Figure 13:
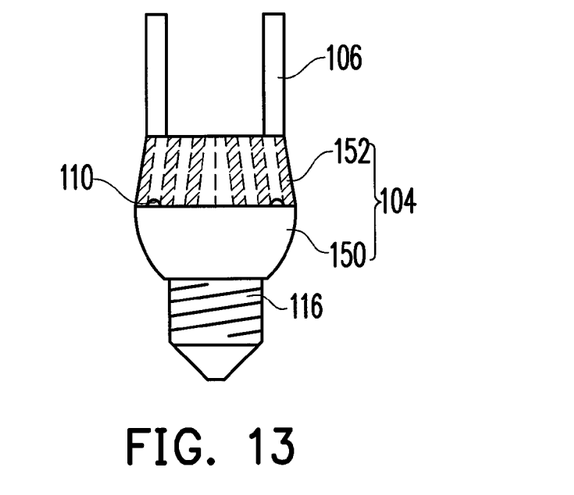
FIG. 13 is a drawing, schematically illustrating cross-sectional structures of illuminating devices, according to an embodiment of the invention.

Even further, FIG. 13 is a drawing, schematically illustrating cross-sectional structures of illuminating devices, according to an embodiment of the invention. Alternatively in FIG. 13, the base 104 may include the electronic base 150 and the coupling wall 152. The electronic base 150 is coupled with the tubular light guide 106 via the coupling wall 152. The coupling wall 152, as previously described, also has the air circulation holes for creating cooling effect. However, the light-emitting devices 110 are disposed on the electronic base 150 at the locations under the tubular light guide 106. In other words, the electronic base 150 with the light-emitting device 110 may be fabricated and assembled before hand, for example. Also and, the tubular light guide 106 may be coupled with the coupling wall 152 in fabrication option. However, the coupling wall 152 and the electronic base 150 may be considered as the part structures for the base 104. The coupling mechanism may also be any known proper manner. However, the feature of the air circulation holes may be added to improve the cooling effect. Further, the geometric shape of the coupling wall 152 may also serve to geometric match between the electronic base 150 and the light guide tube 106.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illuminating device, comprising:
   a tubular light guide, having a light input edge and an inner space;
   a plurality of light-emitting devices, distributed at the light input edge to provide lights into the tubular light guide; and
   a base, supporting the light-emitting devices and the tubular light guide and having an electronic circuit to provide power to the light-emitting devices, wherein the base comprises an air circulation wall connected with the base and bending along the light input edge of the tubular light guide, and the light-emitting devices are disposed on a top surface of the air circulation wail to provide the lights into the tubular light guide.

2. The illuminating device of claim 1, wherein the base has at least one air circulation hole for connecting an outer space with the inner space.

3. The illuminating device of claim 2, wherein the air circulation hole is formed on the air circulation wall.

4. The illuminating device of claim 3, wherein the light-emitting devices are disposed between the top surface of the air circulation wall and the light input edge of the light guide to provide the lights into the tubular light guide.

5. The illuminating device of claim 3, further comprising an adapting structure disposed on the air circulation wall, wherein the light-emitting devices are disposed on the adapting structure.

6. The illuminating device of claim 2, wherein the base comprises:
   a circuit base, for adapting the light-emitting devices; and
   a coupling wall, for mechanically coupling the circuit base and the tubular light guide, wherein the coupling wall has the air circulation hole.

7. The illuminating device of claim 1, wherein the tubular light guide has a surface texture at an outer surface, an inner surface, or both the outer surface and the inner surface.

8. The illuminating device of claim 1, further comprising a light reflecting layer or a light shielding layer disposed on an inner surface of the tubular light guide.

9. The illuminating device of claim 8 wherein the base has a protruding portion extending into the inner space of the tubular light guide.

10. The illuminating device of claim 9 wherein a portion of the electronic circuit is implemented in the protruding portion of the base.

11. The illuminating device of claim 9, wherein the electronic circuit is implemented in the protruding portion of the base.

12. The illuminating device of claim 9, wherein the base has at least one air circulation hole for connecting an outer space with the inner space.

13. The illuminating device of claim 1, wherein the base has a protruding portion extending into the inner space of the tubular light guide.

14. The illuminating device of claim 13 wherein a portion of the electronic circuit is implemented in the protruding portion of the base.

15. The illuminating device of claim 13 wherein the electronic circuit is implemented in the protruding portion of the base.

16. The illuminating device of claim 13, wherein an outer surface of the protruding portion has a specific pattern thereon.

17. The illuminating device of claim 13, wherein the base has at least one air circulation hole for connecting an outer space with the inner space.

18. The illuminating device of claim 1, further comprising a reflection layer on a top edge of the tubular light guide opposite to the light input edge.

19. The illuminating device of claim 1, wherein the tubular light guide has a cross-sectional geometric shape.

20. The illuminating device of claim 19, the cross-sectional geometric shape is round, elliptic, square, rectangular, triangular, polygon, round with a peripheral protruding part, or indent polygon.

* * * * *